United States Patent [19]

Horton

[11] 4,006,594
[45] Feb. 8, 1977

[54] SOLAR POWER PLANT

[76] Inventor: Paul F. Horton, 9393 Hackamore Drive, Boise, Idaho 83705

[22] Filed: May 12, 1975

[21] Appl. No.: 576,811

[52] U.S. Cl. .................................. 60/641; 60/527
[51] Int. Cl.² ........................................ F03G 7/02
[58] Field of Search ............ 60/527, 529, 675, 641; 126/270, 271

[56] References Cited

UNITED STATES PATENTS

| | | | |
|---|---|---|---|
| 2,931,189 | 4/1960 | Sigworth | 60/527 UX |
| 3,303,642 | 2/1967 | Lee | 60/527 X |
| 3,390,672 | 7/1968 | Snelling | 126/271 |
| 3,430,441 | 3/1969 | Adams | 60/529 |
| 3,509,716 | 5/1970 | Avery | 60/641 |

*Primary Examiner*—Allen M. Ostrager

[57] ABSTRACT

A solar power plant having a means for collecting solar heat and a means for applying the heat so collected to a selected portion of a plurality of expansile-contractile members movably mounted between two wheels set at a desired angle on to the other, said wheels being rotatably mounted upon a frame. Heating or cooling a member causes either expansion or contraction of the member with a resultant linear force being developed between corresponding points on said wheels; said linear force being translated into rotational force as the wheels rotate in such direction as to relieve the linear force. Successive heating and cooling of said members enables continuous rotation of the wheels and a resultant work output. A power take-off unit is provided.

11 Claims, 5 Drawing Figures

U.S. Patent
Feb. 8, 1977
4,006,594
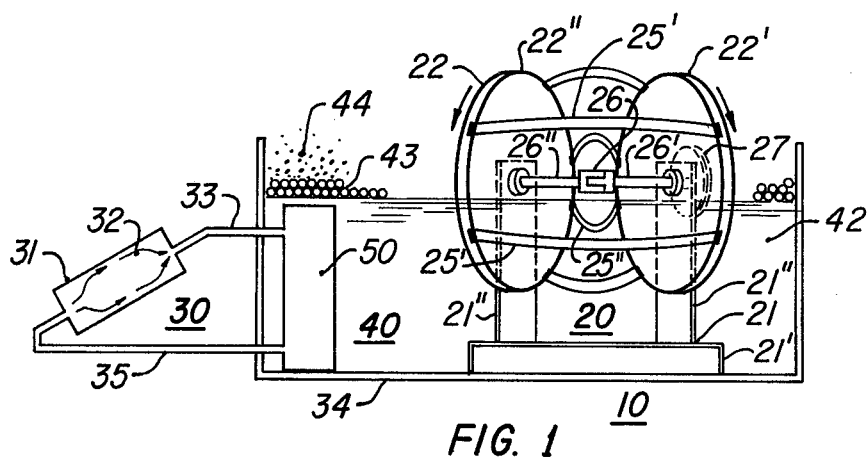
FIG. 1
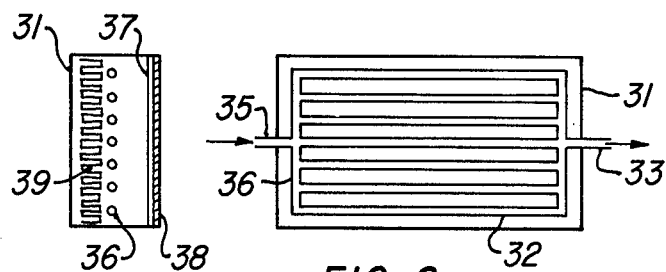
FIG. 2
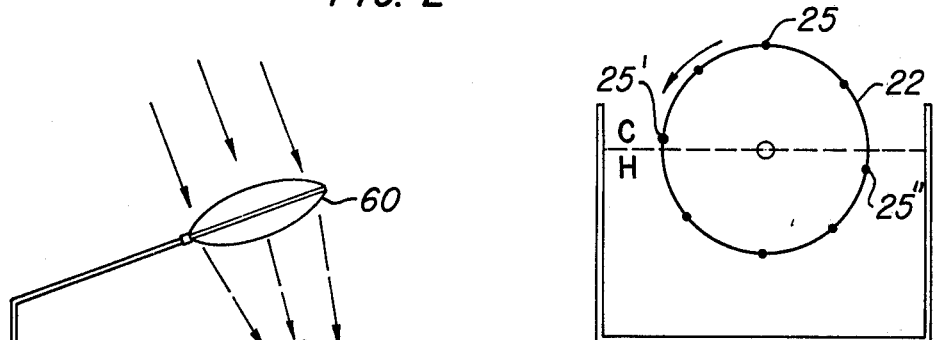
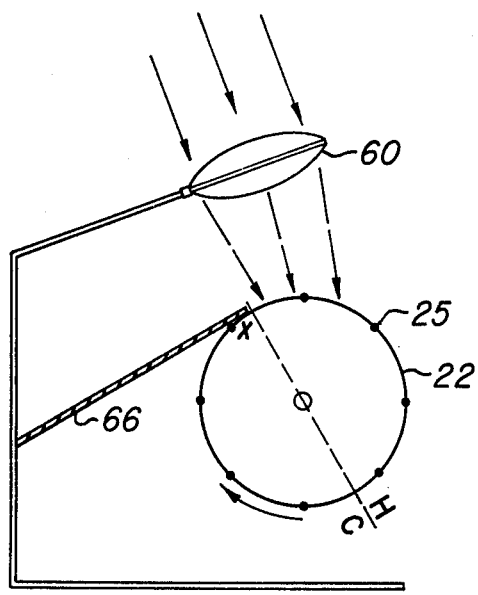
FIG. 4
FIG. 3
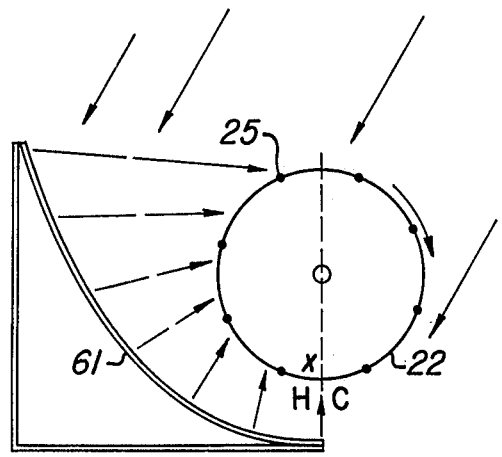
FIG. 5

SOLAR POWER PLANT

BACKGROUND OF THE INVENTION

1. Field of the Invention

This invention relates, in general, to power plants using expansion and contraction characteristics of gases, liquids, and solids in generation of power, and in particular, to expansion-contraction power plants which are driven by solar heat energy.

2. Description of the Prior Art

The desirability of utilizing solar energy has long been recognized. Solar energy spent to lift vast quantities of water has been partially recaptured in the form of water-power through the use of hydroelectric plants. To a much lesser extent solar energy has been utilized in the form of windpower and photovoltaic power. Solar energy when used directly is non-polluting and replaceable as compared with fossil fuels.

Solar power plants in the prior art have utilized large paraboloidal reflectors as a solar heat collector and have used either the steam engine, operating under the Rankine cycle, or the hot air engine, operating under the Brayton cycle, as energy converters. Operation under the Rankine cycle requires a condensable vapor as the working fluid; a boiler; transference of heat through the walls of the boiler; and a heat dissapator means. Operation under the Brayton cycle requires a gas as the working fluid; a sealing means; a compressor; expander means; and transference of heat through the walls of the gas container. With either the Rankine cycle or the Brayton cycle, work is done only during the expansion process.

Heat pumps and power plants utilizing expansile-contractile members between rotating wheels are illustrated by Sigworth, U.S. Pat. No. 2,931,189 and Guillot, French Pat. No. 394,335. Senft, U.S. Pat. No. 3,355,880 and Bangerter, U.S. Pat. No. 1,260,300 illustrate the use of metals of expansile-contractile members.

SUMMARY OF THE INVENTION

The present invention comprises, generally, a solar power plant having expansile-contractile members as the working material. These members are mounted movably between two wheels set at a selected angle one to the other. Contraction or expansion of the members cause the wheels to rotate about their axes in such a direction as to alleviate the force created by the expansion or contraction. Selective heating and cooling of a portion of a plurality of such members enables continuous rotation of the wheels which are rotatably mounted to a frame. The wheels are connected in one embodiment of the invention by a Universal joint, said joint causing the wheels to rotate together as a unit. The driving force is solar heat collected and applied so as to create a hot sink and a cold sink.

It is an object of the present invention to provide a solar heat converter which collects solar heat and applies the solar heat so collected to expansile-contractile members in such a manner that work output may thereby be obtained.

It is also an object of the present invention to provide a solar power plant from which work output may be obtained during both the contraction phase and the expansion phase.

More particularly, it is an object of the present invention to collect and apply solar heat energy to expansile-contractile material without fluid containing means or without compression means.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a schematic view of a preferred embodiment of the solar power plant.

FIG. 2 is a cross sectional and sectional plan view of the Exterior heat collector.

FIG. 3 is a partial sectional view of the Converter unit showing the hot and cold sinks.

FIG. 4 is a schematic view showing use of a focusable lens as the solar heat collector and applier.

FIG. 5 is a schematic view showing a paraboloidal reflector as the solar heat collector and applier.

DETAILED DESCRIPTION OF THE INVENTION

Referring now to the drawings, and, more particularly, to FIG. 1, an embodiment to be preferred of a solar power plant 10, made according to the present invention is disclosed. Solar power plant 10 includes a converter unit 20, a solar heat collector 30 and a solar heat applier 40.

The solar heat collector 30, one of several preferable embodiments which may be used, includes an exterior heat collector 31, an interior heat conducting fluid 32, a heat distribution pipe 33, a storage 34 and a fluid return pipe 35.

The exterior heat collector 31 may be seen to better advantage in FIG. 2. Collector 31 includes a plurality of interconnected fluid containing tubes 36 connected at one end to return pipe 35 and at the other end to distribution pipe 33. Tubes 36 are externally connected with a high heat absorbent metal such as copper which is blackened with a low reflective paint. External heat collector 31 is placed upon the terrain in such a manner as to maximize solar absorption and also so that the end that is connected to return pipe 35 is lower than the end connected to distributor pipe 33 so that interior heat conducting fluid 32, upon being heated, rises and thus a fluid current is created going in the direction of the distributor pipe 33. External heat collector 31 may be covered with a suitable glazing 38 so as to eliminate heat loss into the atmosphere. Insulator 39 is placed beneath tubes 36 to prevent heat loss into the earth. It is contemplated that parabaloidal troughs, a modification of parabaloidal discs discussed later in these specifications, may be used to focus solar rays onto tubes 36.

Referring again to FIG. 1, it may be seen that interior heat conducting fluid 32 receives heat through the walls of tubes 36 of exterior heat collector 31 and carries the heat through distribution pipe 33 to heat exchange unit 50. Heat is transferred in heat exchanger unit 50 from interior heat conducting fluid 32 to another and separate heat conducting fluid hereinafter called first fluid 42. Heat exchange unit 50 may be comprised simply of a network of tubes or more elaborate means may be employed. It is readily apparent that the heat exchange unit may be omitted with the heat conducting fluid 32 going directly into storage tank 34. The heat exchange unit is used wherever it is desirable to have a first fluid 42 having different physical characteristics than heat conducting fluid 32. Water is a suitable fluid to use as heat conducting fluid 32 and a light grade oil having low viscosity and low volatility is best suited for use as first fluid 42.

Storage tank 34 serves to contain first fluid 42 in such a manner that the fluid comes into contact with a selected plurality of expansile-contractile members 25 and therefor applies heat to these members. First fluid 42 is applied selectively to members 25 by controlling the depth of the fluid or by raising, lowering, or suspending converter unit 20 in any suitable manner. Storage tank 34 may be formed of any fluid tight material. It is desirable that the tank be insulated from its surroundings to prevent heat loss.

Also contained in storage tank 34 is a second fluid 44, floating upon first fluid 42 and coming into contact with a different portion of expansile-contractile members 25. Second fluid 44 must be at a different temperature than first fluid 42 for the apparatus to be operable. Second fluid 44, in the embodiment shown, is cool air. Ambient air temperatures may be sufficient for cooling, without a cooling means, depending upon temperatures desired and time of operation.

In the preferred embodiment of this invention and in accordance with the solar heat applier described above, it is desirable that an insulator 43 be horizontally disposed between first fluid 42 and second fluid 44. Insulator 43 substantially prevents heat exchange between fluids 42 and 44 and therefor makes for a more efficient operation. The insulator 43 is formed in such a manner as to allow easy passage of expansile-contractile members 25 as they rotate between fluids 42 and 44. Insulator 43 must also be of such density that it settles to the bottom of second fluid 44 and floats upon first fluid 42. Small spheres of air filled plastic are used in the embodiment illustrated.

It is to be observed that in the above description that first fluid 42 is the means for selectively applying the solar heat to expansile-contractile members 25. Second fluid 44 serves to cool the members. It is then contemplated that, within the meaning of the claims of this specification, the term hot sink applies to the plurality of expansile-contractile members which are heated and the term cold sink applies to that portion of the plurality of said members that are cooled at any particular instant.

The part of the apparatus that converts the solar heat collected into mechanical energy is the converter unit 20. The unit includes a frame 21, a pair of rotatably mounted wheels 22 upon said frame, a plurality of expansile-contractile members 25, and means for governing the relative positions of said wheels, U-joint 26.

Frame 21 is formed by a base member 21' and a pair of side arms 21" directly opposed to one another and set at a desired angle to each other so that their interior surfaces are on intersecting planes. Although not disclosed in the drawings, it is contemplated that side arms 21" might be pivotally secured at their point of connection with base member 21' so as to conveniently alter the angular disposition of side arms 21" one to the other. Frame 21 may be fabricated of any suitable material of low elasticity and of sufficient strength to support the load.

Rotatably mounted to the internal surfaces of side arms 21" are a pair of wheels 22' and 22'", the axes of which are perpendicular to the internal surfaces of side arms 21" and which are therefor angularly disposed to one another in the same manner as side arms 21". It is to be noted that as the angular disposition of the side arms 21" are altered that the angular disposition of the wheels is similarly altered. Provisions may also be added for altering the length of base member 21', if desired, so as to accomodate expansile-contractile members 25 of varying length. Conventional means for mounting the wheels to the frame may be used. Where large forces are to be encountered, thrust bearings about the periphery of the wheels locatable between the wheels and the frame are to be recommended.

A plurality of expansile-contractile members 25 are movably mounted, preferably in horizontally parallel planes between wheels 22' and 22". Members 25, as shown in the illustration, are connected near the rim of the wheels. It is to be understood that connections may be made between any corresponding points on the interior surfaces of the wheels. Hinges are the recommended means for fastening the expansile-contractile members 25 to the wheels 22 when the members comprise bimetal strips. U-joint connections or ball and socket connections may also be used and are preferable when members 25 comprise piston assemblies.

Bimetal expansile-contractile members 25 are used in the preferred embodiment of this invention. FIG. 3, taken in conjunction with FIG. 1, best illustrates operation of the converter unit with bimetal members 25. The dotted line in FIG. 3 represents the division between the cold sink, designated C and the hot sink H. Now, as member 25' is caused to be rotated counterclockwise, it reaches the point where it is most extended, this being the point of greatest divergence between wheels 22 and also the point where the bimetal member 25' enters the hot sink H. It will now be seen that as heat is applied to bimetal strip 25', it begins to bend as the two metals comprising the strip expand at different rates. This bending effectively shortens the distance between the two ends of the strip thus creating a linear force tending to pull wheels 22 into closer apposition. This inward pull on the wheels is hereinafter referred to as contraction. An outward push on the wheels will be referred to as expansion. Now, as bimetal strip 25' exerts an inward pull, the wheels 22 rotate in a counterclockwise direction so as to alleviate this inward pull. Upon maximum contraction of the bimetal strip 25', the wheels 22 have rotated to their point of closest apposition which coincides with the point where bimetal strip 25' once again enters the cold sink C. It will now become apparent that as bimetal strip 25' causes the counterclockwise rotation of the wheels that bimetal strip 25" is carried from its initial position in the hot sink H into the cold sink C. Upon entering the cold sink, member 25" begins to expand, creating an outward force between wheels 22 which also causes a counterclockwise rotation of wheels 22. It is thus apparent that rotation with a resultant work output is caused by both expansion and contraction of the members 25. It is also apparent that with a plurality of members, continuous rotation of the wheels may be affected. Choice of bimetal depends upon a number of factors including work output desired, temperatures available, size of wheels 22, etc. While the particular embodiment described refers to strips of bimetal, it is to be understood that other forms of bimetal such as discs and coils may also be used.

Referring again to FIG. 1, it may be seen that power take-off unit 27 is attached to wheel 22'. The unit may be attached by bolting, welding, or otherwise. The unit illustrated comprises a pulley operable with a belt. It is obvious that other power take-off units such as the chain and sprocket may be similarly used.

FIG. 1 also shows a conventional universal joint 26 as the means for positioning wheels 22' and 22" relative to each other. Use of the universal joint assures the same rate of movement between the wheels and causes the wheels to rotate as a unit. U-joint 26 is attached by welding or otherwise to the wheels 22' and 22" at their axes by shafts 26' and 26" respectively.

FIG. 4 shows an alternate preferable embodiment of the present invention in which the means for collecting the solar heat comprises a focusable lens 60 and a heat conductor 25 for receiving the focused heat rays. Lens 60 may be of any of the type of lenses known as positive or collecting lenses. A common biconvex lens is shown in the embodiment as illustrated in FIG. 4. Glass is the preferred material for forming the lens. It is to be understood that lens systems are also within the contemplation of these specifications. The heat conductor in the preferred embodiment, as shown, comprises bimetal strips 25, the expansile-contractile working material of this invention. Focusing solar rays directly on the bimetal members 25 creates a heat sink H. Another portion of the bimetal strips remain outside the focused rays and comprise cold sink C. In operation, if the wheels are at their greatest divergence at point x, then heating of the strips in hot sink H will cause a clockwise rotation of wheels 22 as previously explained. Similarly, cooling of the strips in cold sink C will cause a clockwise rotation of the wheels. In the preferred embodiment of the present invention, the heat conductor 25, being an expansile-contractile member, is used because the two steps of collecting and applying solar heat is thereby accomplished by simplified apparatus, eliminating the need of a heat conducting fluid. Although this particular embodiment entails nearly simultaneous functions of collecting and applying solar heat, this is not the case when other heat conductors are used. It may be advantageous to collect the heat at one part of the day and apply the heat to the expansile-contractile members 25 during another part of the day.

FIG. 5 shows another preferred embodiment of the present invention in which the focusable lens for collecting and applying the solar heat comprises a reflective concave disc, paraboloidal reflector 61. In this embodiment as in the embodiment immediately hereabove described the heat conductor for receiving focused rays comprises expansile-contractile members 25. Members receiving the focused rays then become hot sink H and members out of the focused rays become the cold sink C. In operation, if the wheels 22 are at their greatest divergence at point x, then heating of the strips in the hot sink H will cause a clockwise rotation of the wheels and cooling of the strips in the cold sink C will likewise cause a clockwise rotation of the wheels as shown by the arrow. Paraboloidal reflector 61 may be fabricated from any suitable reflective material such as polished metals or mirrors.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for converting solar heat energy into mechanical energy which comprises:
    a converter unit, said converter unit including
        a frame;
        a pair of wheels rotatably mounted on said frame and set at a selected angle one to the other so that a linear force developed between corresponding points on each of said wheels will cause rotation thereof;
        a plurality of continuously driving expansile-contractile members for producing the linear force, movably mounted on and between said wheels;
        means for governing the position of each of said wheels relative to one another so that said wheels rotate as a unit;
    means for collecting solar heat; and
    means for selectively applying the solar heat so collected to said expansile-contractile members so that a hot sink and a cold sink are thereby created.

2. A solar heat converter as recited in claim 1, wherein said expansile-contractile members comprise bimetallic members.

3. A solar heat converter as recited in claim 1, wherein said collector means comprises:
    a focusable lens; and
    a heat conductor for receiving focused rays from said focusable lens, said conductor comprising or being in contact with said expansile-contractile members.

4. A collector means in accordance with claim 3, wherein the focusable lens comprises a reflective concave disc.

5. A solar heat converter as recited in claim 1, wherein said collector means comprises:
    an exterior heat collector for absorbing solar heat;
    an interior heat conducting fluid for receiving heat from said exterior collector;
    a heat distribution pipe for containing and conveying said heat conducting fluid;
    a storage tank for receiving and storing a heat conducting fluid and
    a fluid return pipe for returning cooled heat conducting fluid to said exterior heat collector.

6. A collector means in accordance with claim 5, further comprising:
    a heat exchange unit connected to and between said distribution pipe and said return pipe located so that fluid contained in said storage tank is heated by and separated from said interior heat conducting fluid.

7. A solar heat converter as recited in claim 1, wherein the said means for applying the solar heat comprises:
    a first fluid in contact with a selected portion of said plurality of expansile-contractile members;
    a second fluid floating upon said first fluid and being in contact with a different portion of said plurality of expansile-contractile members than said first fluid; one of said fluids being heated by said collector means to a temperature different than the other fluid.

8. A means for applying solar heat in accordance with claim 7, further comprising an insulator locatable between said first and second fluid.

9. A solar heat converter as recited in claim 1, wherein said means for applying the solar heat comprises:
    a focusable lens; and a heat conductor for receiving focused rays from said focusable lens, said conductor comprising or being in contact with said expansile-contractile members.

10. A solar heat converter as recited in claim 1, wherein said means for governing the position of said wheels comprises a universal joint.

11. A solar heat converter as recited in claim 1, further comprising means for a power take-off.

* * * * *